6516X
C. B. Palmer.
Ore Washer.
Patented Apr. 23, 1831.
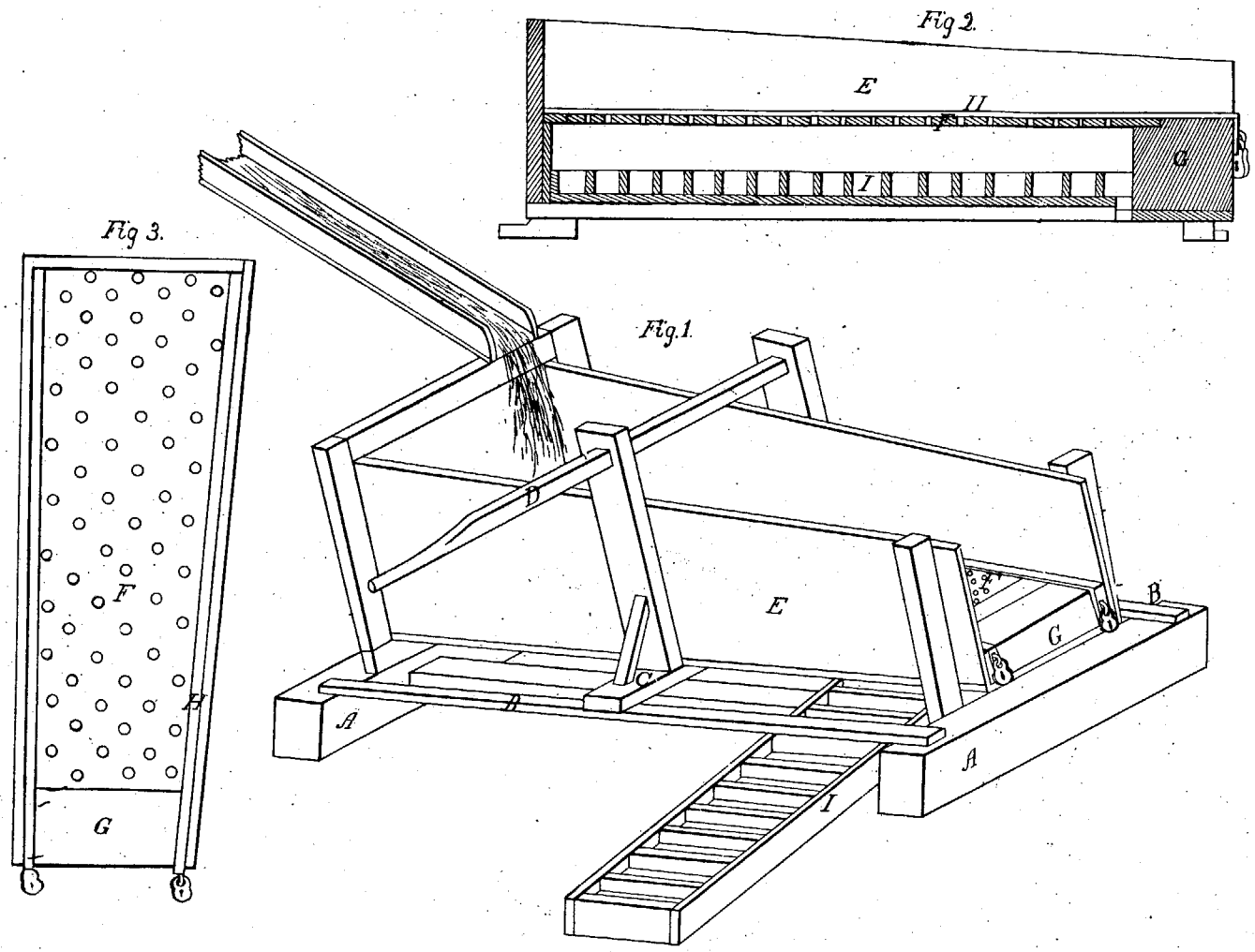
THE NORRIS PETERS CO., WASHINGTON, D. C.

65164 April 23, 1831

Green B. Palmer, Brindletown, North Carolina.

Letters Patent

Dated April 23d 1831.

The Schedule referred to in these Letters Patent and making part of the same, containing a description in the words of the said Green B. Palmer himself of his improvement in the machine for separating gold from earth and other substances.

---

To all whom these presents shall come: Be it known that Green B. Palmer of Brindletown County of Burke and State of North Carolina, has invented a new and useful improvement in the Rocker and inclined plane for washing out gold from the sand, gravel, earth and river dirt, and other mineral and earthy substances, called the [illegible] Rocker, and that the following is a full and exact description of the construction and operation of the said

6516X machine as invented and improved by me (to wit):

There is a trough called a rocker made of strong plank, open at one end and closed at the other, eight feet long and fourteen inches wide at the plate, sloped two inches to the foot on each side so as to be wider at top; with perforated iron plate or sieve in it seven feet long and fourteen inches wide, lying in a horizontal position, but depressed toward the open end of the rocker. Below the perforated iron plate in the rocker the sides thereof are extended down eight or ten inches to a plank bottom with a strong block of solid wood the full width, depth and length of one foot, to come up even with the perforated iron plate, over which the rock, gravel &c. is to pass off at the open end.

The perforated iron plates are fixed in a frame of wood or metal fourteen inches wide and seven feet long, and all so constructed as to be moved, in or out at pleasure, to fit nicely to the sides and ends, and particularly to fit down in a shoulder or rabbet made in the solid block at the lower end so that the upper surface of the frame of perforated iron plate and solid block be even; and to rest on the edges on the inclined plane below it: the bottom of the extended part of the rocker below the perforated iron plate to have a hole three inches by four inches in the centre (or a parcel of auger holes in lieu of it) at the junction of the bottom with the solid block (the said hole or holes being intended to carry off the water, sand &c. in one foot from the head.

The inclined plane or riffle is a box or trough fourteen inches wide at top and seven feet long, six inches deep at the upper end and four and a half inches at the lower end, with sides sloping from the top to the bottom, with stops or bars across it circular at top so as to depress in the middle one and one half inch from three inches at the ends, said stops to be four inches apart in the clear and fixed in so tight as to prevent water or any other thing passing except over them: The riffles then to be placed underneath the perforated iron plate in the rocker with the deepest end up toward the head of the rocker, with a hole in the lower end of the riffle corresponding with the one in the bottom of the rocker or cradle. There could be placed underneath this riffle another or each having quicksilver in them above the bars if the gold should be fine; proper inclination being given and sufficient depth to the box of the rocker or the length of the riffle be extended. There must be three [illegible] three [illegible]; one at each end, and one in the middle. The middle one should extend up above the top of the rocker one or two feet or any other most convenient for fixing the handle or lever which works in the middle, for a joint on the rocker, [illegible] should be [illegible] one foot long, four inches by one and a half inch thick; the bottom piece of the middle frame should be at least four feet long [illegible] to make the joint or [illegible] with the [illegible] springs, one on each side, extending from one end of the frame [illegible] to the other, and [illegible] the springs, [illegible] at the bottom and [illegible] support the rocker, [illegible] should be [illegible] with iron. The machine is [illegible]

6516X pivots or gudgeons, one at each end, the one at the head or upper end four inches high above the blocks, the one at the lower three inches high above the block, and so certain and raised from the frame as to support the rocker poised exactly in the middle of each end on a solid [illegible], the point of the pivot up and so fixed it may work with ease. A [illegible] of iron or other substantial thing should be then placed [illegible] across the rocker from outside to outside, so just over and touching the perforated iron plates so as to bear on them and keep all firm and back [illegible] and to [illegible] [illegible] until used. The whole to be placed on a ground frame on a four [illegible] being placed in the ditch where hands [illegible] that raise the gravel, sand &c containing the gold or else where the workman [illegible]. The ground frame must consist of two solid blocks five feet long, the head block two feet wide and six inches thick, the foot block five feet long, six inches thick, eighteen inches wide, turn these blocks up edge wise and frame them together with a piece of strong timber [illegible] inches wide and four inches thick, the same length of the Rocker if you intend to work on pivots or points. If you intend to work on gudgeons it may be longer or shorter as you have the gudgeons on the inside or outside of the rocker.) The spring to be made of steel [illegible] or tough wood extending from one end to the other and [illegible] on the head blocks that they play [illegible] spring at each vibration when struck in the middle. This rocker or its principal parts can also be worked on the principle of the common [illegible] cradle rocker. The rocker with all its parts, ground frame and all being now properly placed [illegible] the earth &c to be worked, the earth, sand and gravel &c containing the gold is now thrown in at the head of the rocker [illegible] about four feet down from the head, the water conveyed in at the head of the rocker by means of a trough prepared for the purpose, set the rocker in motion and continue the process of throwing in earth, sand &c containing the gold, [illegible] which all may be continued as long as the workmen please, when it is stopped the [illegible]. [illegible] in the same [illegible] half of the water stopped (no more earth or sand &c thrown in). The machine [illegible] gold be panned off to about two or three quarts of [illegible] by this process [illegible] that the gold be easily separated from the sand [illegible] the process of [illegible]. The [illegible] or riffles might also made to work [illegible] at the head of the rocker, and [illegible] that when you want to pan off stop throwing in the earth &c. [illegible] is gone through [illegible]. [illegible] holes in the bottom of the rocker, to [illegible] the water, sand &c. and to carry [illegible] off from [illegible] is fine [illegible] of that metal such as passes through the rocker. As to my claim of improvement [illegible] rocker containing perforated iron plates in a way that the sand, gravel &c. can be thrown in at the upper end [illegible] from the head to the middle or [illegible] perforated iron plates. [illegible] be in motion [illegible] with the [illegible] to [illegible] spring at each vibration. 4th [illegible] pivots or gudgeons [illegible] process of [illegible] the perforated iron plates [illegible]. 6th [illegible] perforated iron plates for panning out. 7th The principle of the spring [illegible] [illegible]. 8th The improvement of the inclined planes or riffles with the [illegible]

Witness
G. A. Erwin
A. C. Pearson

C. B. Palmer

Received [illegible] 20 July 1841

([illegible])

Drawing